United States Patent

[11] 3,627,801

[72] Inventors Ogden R. Pierce;
  John R. Greenwald, both of Midland, Mich.
[21] Appl. No. 67,617
[22] Filed Aug. 27, 1970
[45] Patented Dec. 14, 1971
[73] Assignee Dow Corning Corporation
  Midland, Mich.

[54] FLUOROAROMATIC-CONTAINING ORGANOSILICON COMPOUNDS
  16 Claims, No Drawings

[52] U.S. Cl. .................................................. 260/448.2 D,
  260/46.5 P, 260/448.8 R, 260/825, 252/49.6
[51] Int. Cl. ............................................... C07f 7/08,
  C07f 7/18
[50] Field of Search ..................................... 260/448.2 D,
  448.2 P, 448.8 R, 825

[56] References Cited
  UNITED STATES PATENTS
3,192,181 6/1965 Moore ........................... 260/46.5 P 3,542,830 11/1970 Kim et al. ..................... 260/448.2 D
3,576,021 4/1971 Grindahl ....................... 260/448.2 D
3,576,020 4/1971 Loree et al. .................. 260/448.2 D

*Primary Examiner*—James E. Poer
*Assistant Examiner*—P. F. Shaver
*Attorneys*—Robert F. Fleming, Jr., Laurence R. Hobey, Harry D. Dingman, Howard W. Hermann and Norman E. Lewis ABSTRACT: Compounds of the general formula

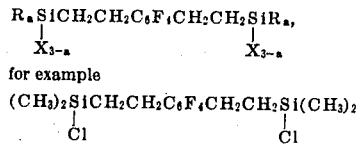

for example $$(CH_3)_2SiCH_2CH_2C_6F_4CH_2CH_2Si(CH_3)_2$$
$$\quad\;\;|\qquad\qquad\qquad\qquad\qquad\qquad\;\;|$$
$$\quad\;\;Cl\qquad\qquad\qquad\qquad\qquad\qquad Cl$$

can be hydrolyzed and condensed to produce polymeric fluids, elastomers and resins.

FLUOROAROMATIC-CONTAINING ORGANOSILICON COMPOUNDS

This invention relates to novel bis-silylfluoroaromatic compounds. In one aspect, the invention relates to silcarbane polymers.

More particularly, the invention provides organosilicon compounds of the general formula $$R_a SiCH_2CH_2C_6F_4CH_2CH_2SiR_a$$
$$\phantom{xxxxx}|\phantom{xxxxxxxxxxxxxxxxxxx}|$$
$$\phantom{xxx}X_{3-a}\phantom{xxxxxxxxxxxxxx}X_{3-a}$$

in which X is the hydroxyl group or a hydrolyzable radial; each R substituent is independently selected from the group consisting of the hydrogen atom, monovalent hydrocarbon radicals, β-perfluoroalkylethyl radicals of from three to 12 inclusive carbon atoms and monovalent halogenated hydrocarbon radicals in which the halogen atom is chlorine, bromine and iodine; and $a$ is an integer having a value of from 0 to 3 inclusive, the sum of the $a$ values being no more than 5.

Thus, the organosilicon compounds of the invention include:

$CH_3Cl_2SiCH_2CH_2C_6F_4CH_2CH_2SiCl_2CH_3$,
$CH_3C_6H_5(OH)SiCH_2CH_2C_6F_4CH_2CH_2Si(OH)C_6H_5CH_3$,
$(C_3H_7)_2CH_3OSiCH_2CH_2C_6F_4CH_2CH_2SiOCH_3(C_3H_7)_2$,
$C_{12}H_{25}(CH_3)ClSiCH_2CH_2C_6F_4CH_2CH_2SiCl(CH_3)C_{12}H_{25}$,
$CH_3(CH_2=CH)OHSiCH_2CH_2C_6F_4CH_2CH_2SiO(CH= CH_2)CH_3$,
$C_6H_5(HO)_2SiCH_2CH_2C_6F_4CH_2CH_2(OH)_2C_6H_5$,
$C_6H_5(CH_3)(H)SiCH_2CH_2C_6F_4CH_2CH_2Si(H)(CH_3)C_6H_5$,
$C_2H_5(C_3H_7)(C_2H_5O)SiCH_2CH_2C_6F_4CH_2CH_2Si(OC_2H_5)(C_3H_7)C_{2n}{}^{H}{}_5$,
$C_4H_9(CH_3)_2O=NO]_2SiCH_2CH_2C_6F_4CH_2CH_2Si[ON=C(CH_3)_2b-]_2C_4H_9$,
$C_4F_9CH_2CH_2(CH_3)(Cl)SiCH_2CH_2C_6F_4CH_2CH_2Si(Cl)(CH_3)CH_2CH_2C_4F_9$
$(CH_3O)_3SiCH_2CH_2C_6F_4CH_2CH_2Si(OCH_3)_3$, $$(CH_3)(CH_3\overset{\overset{O}{\|}}{C}O)_2SiCH_2CH_2C_6F_4CH_2CH_2Si(O\overset{\overset{O}{\|}}{C}CH_3)_2(CH_3)$$

$C_{18}H_{37}(H)(Cl)SiCH_2CH_2C_6F_4CH_2CH_2Si(Cl)(H)C_{18}H_{37}$,

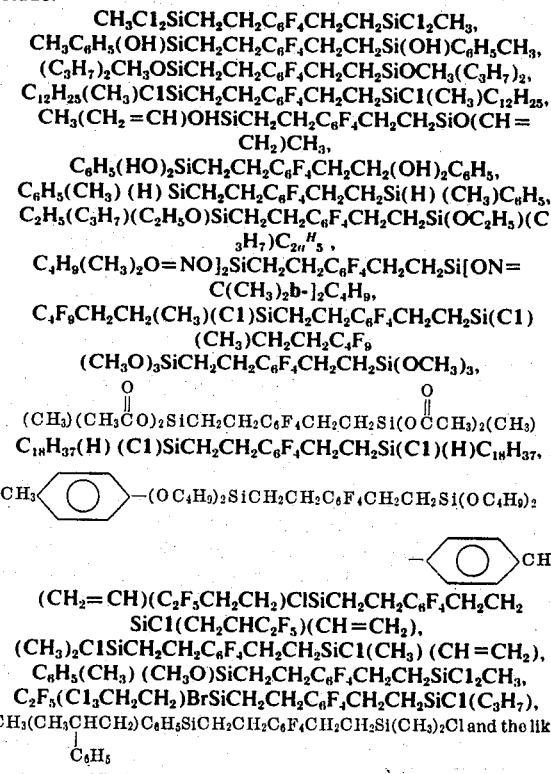

$(CH_2=CH)(C_2F_5CH_2CH_2)ClSiCH_2CH_2C_6F_4CH_2CH_2SiCl(CH_2CHC_2F_5)(CH=CH_2)$,
$(CH_3)_2ClSiCH_2CH_2C_6F_4CH_2CH_2SiCl(CH_3)(CH=CH_2)$,
$C_6H_5(CH_3)(CH_3O)SiCH_2CH_2C_6F_4CH_2CH_2SiCl_2CH_3$,
$C_2F_5(Cl_3CH_2CH_2)BrSiCH_2CH_2C_6F_4CH_2CH_2SiCl(C_3H_7)$,
$CH_3(CH_3CHCH_2)C_6H_5SiCH_2CH_2C_6F_4CH_2CH_2Si(CH_3)_2Cl$ and the like.
$\phantom{xxxxx}|$
$\phantom{xxxx}C_6H_5$ As specified above, X can be the hydroxyl group or any hydrolyzable radical. The term "hydrolyzable radical" as used in this specification is defined as a substituent which reacts with water at room temperature to form silanol groups. Exemplary of hydrolyzable groups are the halogen atoms, such as F, Cl, Br or I; groups of the formula —OZ when Z is any hydrocarbon or halogenated hydrocarbon group such as methyl, ethyl, isopropyl, octadecyl, allyl, hexenyl, cyclohexyl, phenyl, benzyl, beta-phenylethyl, 2-chloroethyl, chlorophenyl, 3,3,3-trifluoropropyl or bromocyclohexyl; any hydrocarbon ether radical such as 2-methoxyethyl, 2-ethoxyisopropyl, 2-butoxyisobutyl, p-methoxyphenyl or —(CH_2CH_2O)_2CH_3; any acyl radical such as acetyl, propionyl, benzoyl, cyclohexoyl, acrylyl, methacrylyl, stearyl, naphthoyl, trifluoroacetyl, chlorobenzoyl or bromopropionyl; or any N,N-amino radical such as dimethylamino, diethylamino, ethylmethylamino, diphenylamino, or dicyclohexylamino. X can also be any amino radical such as HN_2, dimethylamino, diethylamino, methylphenylamino or dicyclohexylamino; any ketoxime radical of the formula —ON=CM_2 or —ON=CM' in which M is any monovalent hydrocarbon or halogenated hydrocarbon radical such as those shown for Z above and M' in any divalent hydrocarbon radical both valences of which are attached to the carbon, such as hexylene, pentylene or octylene; ureido groups of the formula —N(M)CONM''_2 in which M is defined above and M'' is H or any of the M radicals; carbamate groups of the formula —OOCNMM'' in which M and M'' are defined above or carboxylic amide radicals of the formula —NMC=O(M'') in which M and M'' are defined above. X can also be the sulfate group or sulfate ester groups of the formula —OSO_2(OM) where M is defined above; the cyano group; the isocyanate group; and the phosphate group or phosphate ester groups of the formula —OPO(OM)_2 in which M is defined above.

R can be any monovalent hydrocarbon radical, for example, alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals, such as vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals, such as 1-penten-3-ynyl, 2-ethyl-1-buten-3-ynyl; cycloaliphatic radicals such as cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1.⁴]-5-nonenyl, spiro[4.5]decyl, dispiro[4.1.4.2-1-tridecenyl, decahydronaphthyl, 2,3-dihydroindyl and 1,2,3,4-tetrahydronaphthyl; aryl radicals, such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)-heptyl, benzyl, 2-ethyltolyl, 2-ethyl-p-cumyl, diphenylmethyl, 4,5-diphenylpentyl, 2-phenylethyl and 2-phenylpropyl.

R can also be any monovalent halohydrocarbon radical, for example, aliphatic groups, such as chloromethyl, 3-chloropropyl, 3,3,3-trichloropropyl, chlorooctadecyl; aromatic groups such as dichlorophenyl, tetrabromoxenyl, tetrachlorophenyl, or iodonaphthyl; cycloaliphatic groups such as chlorocyclohexyl, bromocyclopentyl or chlorocyclohexenyl and aralkyl groups such as chlorobenzyl, β-(chlorophenyl)ethyl or β-(iodophenyl)-ethyl or β-(bromophenyl)propyl. Monovalent hydrocarbon and halohydrocarbon radicals containing from one to 18 inclusive carbon atoms are preferred.

The definition of R includes β-perfluoroalkylethyl radicals containing from three to 12 carbon atoms, for example $CF_3CH_2CHB2—$, $C_3F_7CH_2CH_2—$, $C_6F_{13}CH_2CH_2—$, $C_8F_{17}CH_2CH_2—$, $C_{11}F_{23}CH_2CH_2—$ and $C_{12}F_{25}CH_2CH_2—$.

The organosilicon compounds containing the —CH_2CH_2C_6F_4CHA2CH_2— bridge between silicon atoms are prepared by reacting silanes of the formula $$\underset{R_a}{\underset{|}{HSiX_{3-a}}}$$

with 1,3-divinyltetrafluorobenzene in the presence of a platinum catalyst in the conventional manner for adding ≡SiH to compounds having terminal vinyl groups. When it is desired to obtain compounds wherein one silicon atom containing different R substituents than the other silicon atom, mixtures of hydrogen-functional silanes can be reacted with the divinyl benzene. Compounds of the invention in which R is a hydrogen atom are prepared by reaction of corresponding chlorine-substituted compound with a hydrogen-containing silane in the presence of a ligand redistribution catalyst, such as aluminum trichloride or tributylamine, the byproduct being a chlorosilane.

The silanols of the invention (i.e. where X is the hydroxy group) are prepared by hydrolyzing the corresponding hydrolyzable silanes under neutral conditions by any of the methods well known in the art. The preferred method of silanol preparation is by hydrolysis of those compounds in which X is the chlorine atom.

The 1,3-divinyltetrafluorobenzene precursor is prepared by reacting 1,3-dichloro-2,4,5,6-tetrafluorobenzene with butyllithium to obtain a reaction product which is subsequently reacted with ethylene oxide to produce 1,3-bis- (β-hydroxylethyl)tetrafluorobenzene. The bis-hydroxyethyl derivative is reacted with acetyl chloride to produce 1,3-bis- (β-acetoxyethyl)tetrafluorobenzene which is subjected to pyrolysis at about 500° C. to obtain 1,3-divinyltetrafluorobenzene.

Organosilicon compounds in which $a$ has a value of 2 are especially useful as precursors to linear diorganopolysiloxanes.

Additionally, the invention provides siloxane polymers having at least one unit of the formula

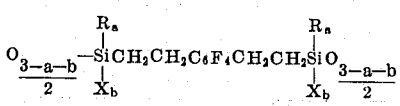

in which X is the hydroxyl group or a hydrolyzable radical; R is independently selected from the group consisting of the hydrogen atom, monovalent hydrocarbon radicals, β-perfluoroalkylethyl radicals containing from three to 12 inclusive carbon atoms and monovalent halogenated hydrocarbon radicals in which the halogen is chlorine, bromine or iodine; $a$ has a value of from 0 to 3 inclusive; $b$ has a value of from 0 to 3 inclusive; the sum of all $a$ and $b$ has values being no greater than 5; any remaining units being of the formula $Z_cSiO_{4-c/2}$ in which Z is independently selected from the group consisting of the hydrogen atom, the hydroxyl, hydrolyzable radicals and organic radicals attached to the silicon atom through an Si—C linkage, and $c$ has a value of from 0 to 3 inclusive.

These siloxanes can be prepared by partial or complete condensation of silanol-containing $=SiCH_2CH_2C_6F_4CH_2CH_2Si=$ compounds or by cohydrolysis or these compounds with silanes of $Z_cSiX_{(4-c)/2}$ in which Z, X and $c$ are as previously defined. The particular method chosen for the hydrolysis or cohydrolysis and condensation can vary widely depending upon the nature of the substituents on the silicon atoms. Thus, there are no critical conditions other than those known for hydrolyzing or cohydrolyzing silanes.

Another method of preparing the siloxanes of the invention is by reaction of $CH_2=CHC_6F_4CH=CH_2$ with siloxanes containing $=SiH$ groups in the presence of platinum catalysts. The conditions for carrying out this reaction are the same as those normally employed in the addition of SiH— containing siloxanes to olefins.

As described above, the siloxanes can be homopolymers or they can be copolymers having various perfluoroalkylene-containing siloxane units. In addition the siloxanes of the invention can contain siloxane units of the formula $Z_c(4_-c)/2$ where $c$ has a value of from 0 to 3 inclusive. These inclined units of the type $SiO_2$, $ZSiO_{3/2}$, $Z_2SiO$ and $Z_2SiO_{1/2}$. The same or different Z groups can be bonded to the same silicon atom.

Z can be hydrogen atom, a hydroxyl group, any of the above defined hydrolyzable groups (X) or an organic radical attached to the silicon through an Si—C linkage, such as any of the monovalent hydrocarbon radicals specifically shown for R above; divalent hydrocarbon radicals, for example, methylene, dimethylene, —CH₂CH=CHCH₂—and octadecamethylene, arylene radicals, for example, phenylene, xenylene, tolylene, xylylene and napthylene; and cycloalkylene radicals such as cylohexylene and cyclopentylene. Z can also be any halohydrocarbon radical, such as described with respect to R or the above described β-perfluoroalkylethyl radicals.

Specifically included within the scope of the invention are siloxanes as described above which have olefin-containing siloxane units, such as

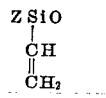

The methylvinylsiloxane units are especially preferred. These olefin-containing siloxane units are usually present in amount in the range of from 0.1 to 10 mol percent to provide crosslinking sites.

The siloxanes of the invention are fluids, resins and elastomeric materials. The resin forms a hard film and can be used as a coating composition. The elastomers have particular utility as sealants in high temperature environments and have a high resistance to degradation upon exposure to radiation and the fluids are useful as lubricants.

The following examples are illustrative of the invention which is delineated in the claims.

EXAMPLE 1

Preparation of 1,3-Divinyltetrafluorobenzene

A mixture of 88 grams of 1,3-dichlorotetrafluorobenzene and 1 liter of ether was placed in a 3-liter flask and cooled to −76° C. (dry ice temperature). Approximately 67 grams of butyllithium (15.2% hexane solution) was added over a period of 3 hours. After addition was complete, the reaction mixture was stirred for 3 hours at dry ice temperature. Ethylene oxide (70 grams) was then added and the resulting reaction mixture was stirred overnight at dry ice temperature, after which the cooling bath was removed. The mixture was allowed to warm to +20° C. and 500 ml. of dilute hydrochloric acid was added. After separation, the organic was washed, dried over CaSO₄ and filtered. Evaporation of the solvent and recrystallization gave 1,3-bis(β-hydroxyethyl)tetrafluorobenzene, a white crystalline solid having a melting point of 103.5°–104.5° C.

Acetyl chloride (40 grams) was slowly added to an ice water cooled mixture of 28 grams of 1,3-bis(β-hydroxyethyl) and 40 grams of pyridine in 250 ml. of ether. After addition of the acetyl chloride was complete, the ice bath was removed and the reaction mixture was stirred for an additional hour. Water (150 ml.) was added and the phases were separated. The ether layer was washed with water and dried over CaSO₄. After filtration, the ether was evaporated and the residue was fractionated to yield 29.4 grams of 1,3-bis(β-acetoxyethyl)-tetrafluorobenzene having a boiling point of 120° C./0.7 mm.Hg.

A vertical quartz tube was packed with alumina spheres and heated to 550° C. with the nitrogen flow being adjusted to 100–150 ml./min. the above-described diacetate was added dropwise to the top of the tube. This pyrolysis yielded a yellow liquid which dissolved in ether. The ether solution was washed with water and dried. The solvent was evaporated and the residue was fractionated to obtain 1,3-divinyltetrafluorobenzene having a boiling point of 62° C./5 mm.Hg.

EXAMPLE 2

A mixture of 30 grams of 3,3,3-trifluoropropylmethyl chlorosilane and two drops of 0.1 molar chloroplatinic acid in isopropanol was heated to reflux temperature and a mixture of 15 grams of 1,3-divinyltetrafluorobenzene and 22 grams of 3,3,3-trifluoropropylmethylchlorosilane was added dropwise at a sufficiently slow rate that reflux was maintained without additional heat input. After completion of the addition, reflux was maintained for 10 minutes and the reaction mixture was cooled. Volatiles were removed under vacuum and the residue was fractionated to yield 33.7 grams of the diadduct,

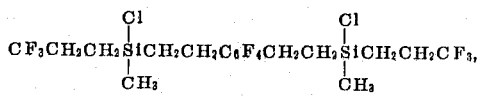

which had a boiling point of 110° C./0.05 mm.Hg.

EXAMPLE 3

A portion (3 grams) of the chlorosilane prepared in example 2 was dissolved in 20 ml. of ether and shaken with 10 ml. of water. The etheral solution was water washed, dried and stripped to yield 2.45 grams of

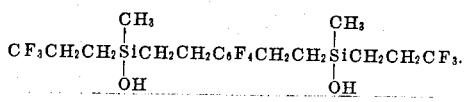

This silanol was mixed with 12 ml. of cyclohexane and one drop of tetramethyl quanidine acetate acid (condensation catalyst) and heated to reflux for 4 hours. After cooling, the cyclohexane was decanted and the polymer stripped under vacuum. The polymer

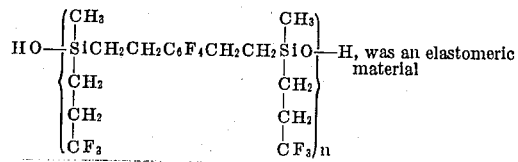, was an elastomeric material having a glass transition temperature (Tg) of −31° C. The polymer exhibited a 10 percent weight loss in air at 373° C.

EXAMPLE 4

A mixture of 9 grams of the chlorosilane obtained in example 2 and 50 ml. of 3,3,3-trifluoropropylvinyldichloro silane in 50 ml. of ether was added to 50 ml. of water, stirred for several hours, separated and water washed. After drying, filtration and evaporation of the ether, one drop of tetramethyl quanidine acetic acid catalyst was added to the cohydrolyzate. The catalyst cohydrolyzate mixture was heated at 137° C. for 4 hours. The resulting polymer was further condensed by refluxing with 50 ml. of toluene for an additional 4 hours. The toluene was removed under vacuum to obtain a hydroxyl-terminated polymer

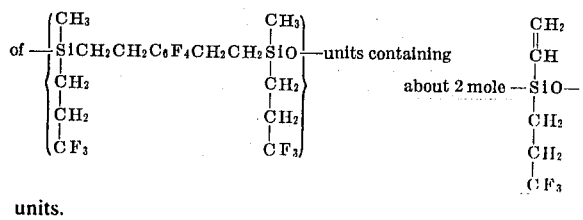

units.

The above polymer (100 parts by weight) was compounded with 40 parts by weight silica, 15 parts by hydroxy-terminated 3,3,3-trifluoropropylmethylpolysiloxane fluid and 0.5 parts by weight of benzoyl peroxide. This rubber formulation was cured for 8 hours at 200° C. The cured elastomer had a tensile strength of 806 p.s.i. Thus, the polymers are useful as solvent resistant, reversion resistant elastomers and sealants.

EXAMPLE 5

When 1,3-divinyltetrafluorobenzene is reacted with dimethylochlorisilane in the presence of chloroplatinic acid and the reaction product,

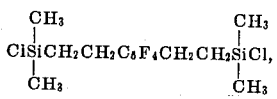

is hydrolyzed and condensed there is obtained a polymer of units of the formula

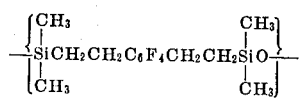

which is an elastomeric material depending upon the molecular weight.

EXAMPLE 6

When $Cl_3SiCH_2CH_2C_6F_4CH_2CH_2SiCl_3$ is cohydrolyzed in a toluene solution with equimolar portions of $CH_3SiCl_3$ and $C_6H_5SiCl_3$ and a small amount of $CH_3(CH_2CH)SiCl_2$, a high-viscosity resin is obtained. This resin, containing $O_{3/2}SiCH_{22}C_6F_4CH_2CH_2SiO_{3/2}$ units, can be cured with a peroxide catalyst at about 150° C. to provide durable coating on metal substrates

EXAMPLE 7

$(CH_3)_3SiCH_2CH_2C_6F_4CH_2CH_2Si(CH_3)_2Cl$ can be reacted with

 to provide a

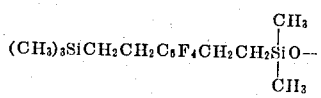

terminated fluid lubricant.

Reasonable modification and variation are within the scope of the invention which sets forth novel organosilicon compound and polymers prepared therefrom.

That which is claimed is:

1. Organosilicon compounds of the formula

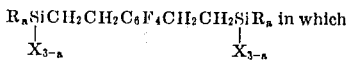

in which

X is the hydroxyl group or a hydrolyzable radical, and each R is independently selected from the group consisting of the hydrogen atom, monovalent hydrocarbon radicals, β-perfluoroalkylethyl radicals containing from 3 to 12 inclusive carbon atoms and halogenated hydrocarbon radicals in which the halogen atom is chlorine, bromine or iodine; and a is an integer having a value of from 0 to 3, the sum of all a values being no greater than 5.

2. Compounds in accordance with claim 1 wherein R is selected from the group consisting of monovalent hydrocarbon radicals having from one to 18 inclusive carbon atoms, β-perfluoroalkylethyl radicals containing from three to 12 inclusive carbon atoms and halogenated hydrocarbon radicals having from one to 18 inclusive carbon atoms in which the halogen atom is chlorine, bromine, or iodine.

3. Compound in accordance with claim 2 in which a has a value of 2.

4. Compound in accordance with claim 3 in which X in chlorine atom.

5. Compounds in accordance with claim 4 in which all of the R substituents are methyl groups.

6. Compounds in accordance with claim 2 wherein X is a hydroxyl group and a has a value of 2.

7. In accordance with claim 1, a compound of the

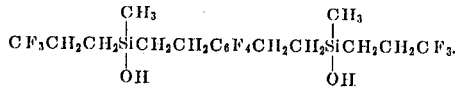

8. In accordance with claim 1, a compound of the

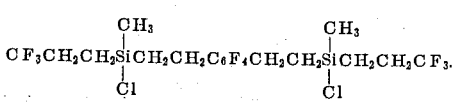

9. A polymeric siloxane having at least one unit of the formula

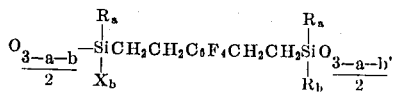

in which
X is the hydroxyl group or a hydrolyzable radical;
R is independently selected from the group consisting of the hydrogen atom, monovalent hydrocarbon radicals, a β-perfluoroalkylethyl radicals containing from three to 12 inclusive carbon atoms and monovalent halogenated hydrocarbon radicals in which the halogen is chlorine, bromine or iodine;
$a$ has a value of from 0 to 3 inclusive;
$b$ has a value of from 0 to 3 inclusive; the sum of all $a$ and $b$ has values being no greater than 5; any remaining units being of the formula $Z_c SiO_{(4-c)/2}$ in which
Z is independently selected from the group consisting of the hydrogen atom, the hydroxyl, hydrolyzable radicals and organic radicals attached to the silicon atom through an Si—C linkage, and
$c$ has a value of from 0 to 3 inclusive.

10. Siloxanes in accordance with claim 9 consisting essentially of units of the formula

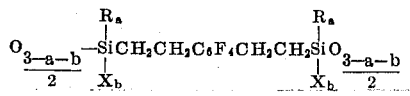

in which X, R, $a$ and $b$ are as defined in claim 9.

11. Siloxanes in accordance with claim 9 in which R is selected from the group consisting of monovalent hydrocarbon radicals having from one to 18 inclusive carbon atoms, β-perfluoroalkylethyl radicals containing from three to 12 inclusive carbon atoms and halogenated hydrocarbon radicals having from one to 18 inclusive carbon atoms in which the halogen atom is chlorine, bromine or iodine and in which Z is selected from the group consisting of R radicals, the hydrogen atom, hydroxyl groups and hydrolyzable radicals.

12. Siloxanes in accordance with claim 11 in which any remaining units are of the formula

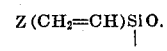

13. Siloxanes in accordance with claim 12 wherein the remaining units of the formula

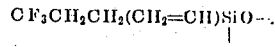

14. Siloxanes in accordance with claim 9 consisting essentially of units of the formula

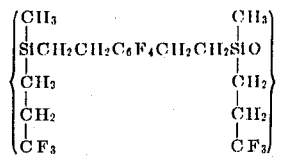

15. Siloxanes in accordance with claim 9 containing units of the formula

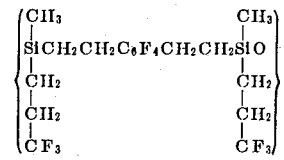

any remaining units being of the formula

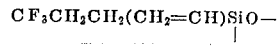

16. Siloxanes in accordance with claim 9 wherein all of the R substituents are methyl radicals.

* * * * *